United States Patent [19]

Sousek

[11] Patent Number: 5,038,887
[45] Date of Patent: Aug. 13, 1991

[54] CONTROL CONSOLE FOR BIDIRECTIONAL SERVICE VEHICLE

[75] Inventor: Eugene A. Sousek, Chilton, Wis.

[73] Assignee: M-B Company, Inc. of Wisconsin, Chilton, Wis.

[21] Appl. No.: 348,693

[22] Filed: May 8, 1989

[51] Int. Cl.[5] .......................... B60K 26/00; B60N 2/00
[52] U.S. Cl. .................................... 180/329; 180/327; 180/89.13
[58] Field of Search ...................... 180/326, 89.13, 330, 180/329, 315, 323; 297/349; 280/775

[56] References Cited

U.S. PATENT DOCUMENTS

| 3,134,454 | 5/1964 | Jonkers et al. | 180/329 |
| 3,357,513 | 9/1965 | Sundberg | 180/329 |
| 4,059,171 | 11/1977 | Pakosh | 180/328 |
| 4,278,144 | 7/1981 | Perin | 180/89.13 |
| 4,546,849 | 11/1985 | Kelly et al. | 180/89.13 |

FOREIGN PATENT DOCUMENTS 1013113 12/1965 United Kingdom .

Primary Examiner—Richard A. Bertsch
Attorney, Agent, or Firm—King and Schickli

[57] ABSTRACT

An operator control console and motion/speed linkage assembly for a bidirectional vehicle is provided. The operator console includes a platform, an operator seat attached to the platform and integral control and steering units. The operator console is mounted for rotational movement around a bearing ring. An interface link in the linkage assembly includes a rotatable sleeve supporting a pin attached to a throttle cable which actuates the reversible valve of the hydrostatic drive of the vehicle. When the control lever is in the neutral position, the pin and supporting sleeve extend along the rotational or pivot axis of the console. The rotatable sleeve swings about an axis substantially perpendicular to the rotational axis, acting to operate the throttle cable which in turn actuates the hydrostatic drive of the vehicle. When the platform is rotated to switch the direction of vehicle movement, the rotatable sleeve freely pivots around the pin to provide proper operator orientation and throttle operation.

10 Claims, 2 Drawing Sheets

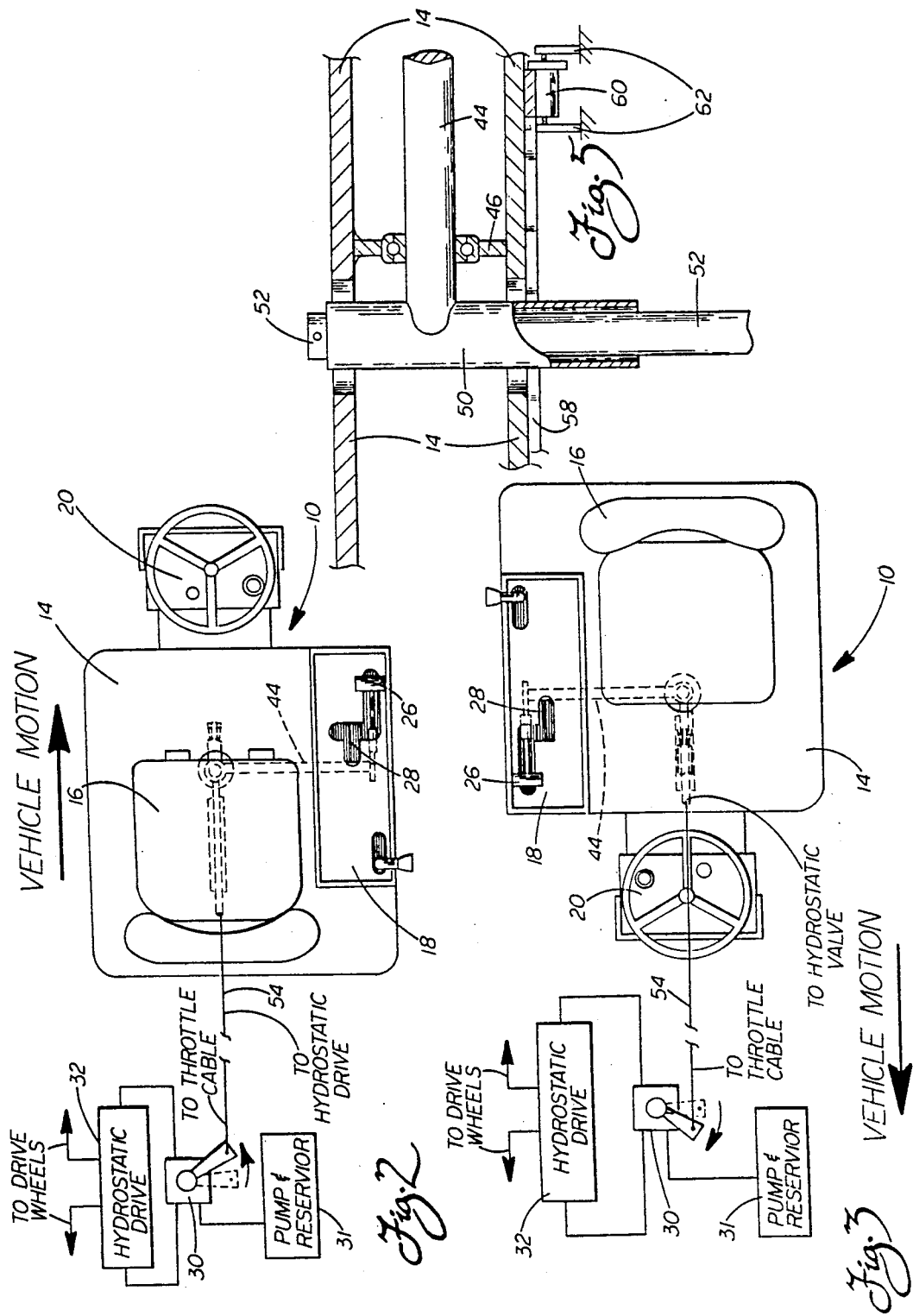

CONTROL CONSOLE FOR BIDIRECTIONAL SERVICE VEHICLE

TECHNICAL FIELD

The present invention relates to an improvement in bidrectional service vehicles or the like, and more particularly, to an operator console and motion/speed linkage assembly which facilitates rotation of the console between two positions of opposite direction. Furthermore, the motion/speed controls rotate with the operator console to allow the operator to manipulate the controls in the same manner independent of his orientation and provide proper direction of vehicle movement.

BACKGROUND OF THE INVENTION

Service vehicles have many applications in today's workplace. These multi-use tractors can perform among other tasks, heavy outdoor construction work, as well as mowing and lawn care work around homes, storage buildings and manufacturing plants. Traditionally such service vehicles have been designed such that the operator can face in only one direction. Such a design offers inherent disadvantages when the vehicle needs to be reversed and moved in a direction opposite to the forward facing cab.

Inherently, the field of vision of the operator may be partially obstructed when looking in a reverse direction over the shoulder. This makes safe operation of the vehicle difficult. In addition, the operator is placed in an uncomfortable position, and having to repeat the procedure over a long period of time can become very tiring. It also may create temporary confusion for the operator when trying to instantaneously remember which direction to turn the steering mechanism while looking in the opposite direction from what is customary. When the vehicle is operating in tight quarters, the slightest incorrect movement could cause substantial damage to the vehicle and surrounding objects and personal injury to people in close proximity.

To explain further, these vehicles are designed to accomplish multiple tasks. Separate attachments are needed for each of the specific tasks. Such attachments may be connected in front of the forward facing cab while others may be connected in the rear of the vehicle. A good example is a loader bucket attached to the front and a back hoe unit on the rear. While grading and loading dirt or other material, the operator should be facing forward with the controls providing the proper steering and motion response. When the back hoe is needed to dig a trench or the like, it is best for the console to be switched so that the same orientation of controls and direction is obtained.

Recently, some service vehicles have recognized this advantage and have been designed so that the operator console within the cab is rotated from its conventional forward facing position to a rearward facing position (180° opposite position). The steering wheel and controls of the vehicle are also reversed to enable them to be operated, and thus control the vehicle, in the same way regardless of which direction the operator is facing.

While this idea has resulted in the obvious advantages to the operation of such vehicles, the designs implementing the rotation of the console have not been without their drawbacks. Many designs have a confusing configuration and complicated control linkages including electrical/hydraulic parts which are generally unreliable. The complicated nature of the designs also reduces the speed in which the operator console may be rotated from a forward facing position to a rearward facing position and vice versa.

It is preferable to have a bidirectional service vehicle in which the controls may be operated in the same manner to control the proper moving direction of the vehicle regardless of its working configuration. It is also preferable to accomplish this result quickly and efficiently with simple mechanical linkage to thus eliminate failure-prone components. These concerns must be addressed while not adversely affecting the ability of the vehicle to perform its assigned tasks.

SUMMARY OF THE INVENTION

It is accordingly, a primary object of the present invention to provide a simple, economical and reliable mechanical arrangement for rotating the operator console of a bidirectional vehicle between a forward facing position and a rearward facing position and which is otherwise well suited to the purpose for which it was designed.

Another object of the present invention is to provide a motion/speed linkage assembly for a bidirectional service vehicle eliminating electrical/hydraulic components and with as few mechanical parts as possible to improve overall reliability and reduce vehicle downtime for maintenance and repairs.

An additional object of the present invention is to provide a bidirectional service vehicle whose operator console can be easily rotated between a forward facing position and a rearward facing position to maximize operator control of the vehicle without adversely affecting the vehicle's ability to perform its assigned tasks.

Another object of the present invention is to provide an operator console with integral steering and control units such that when the console is rotated from a forward facing position to a rearward facing position the steering and control units may be operated in exactly the same manner to control the proper movement of the vehicle.

Still another object of the present invention is to provide a motion/speed linkage assembly for a bidirectional service vehicle with an interface link defining an axis of rotation along the center line of the operator console to facilitate the rotation of the console while allowing proper orientation for operation of the control lever for forward and reverse motion.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved operator console and motion/speed linkage assembly for a bidirectional service vehicle is provided. The operator console includes a support platform that is pivotally mounted to the vehicle. A bearing ring on the underside of the platform rides on a roller assembly mounted on the vehicle. An operator seat and integral control and steering units are mounted to the platform.

The motion/speed linkage assembly includes a control lever received within a shift track on the control unit of the operator console. The control lever is positioned for ready manipulation by the vehicle operator. The control lever is attached to and activates a throttle means, including a throttle cable, through a linkage assembly. The cable operates a reversible hydraulic valve that controls a hydrostatic drive of the vehicle. When the operator manipulates the control lever, he causes the actuation of the hydrostatic drive through the responsive action of the valve and the intermediate parts of the motion/speed linkage assembly.

More specifically, the control lever pivots about a bolt to move laterally and longitudinally along the shift track. The bolt is carried on an actuator plate which pivots about a stub shaft that is mounted on the control unit. The control lever also pivots longitudinally about the bolt to promote the movement of the control lever between the neutral position and the reverse and forward shift positions along the shift track.

A connecting link is provided which attaches the actuator plate to a pivot lever. The pivot lever is attached to the proximate end of a support rod and is positioned in a plane substantially perpendicular to the plane of the support rod. The pivot lever pivots about an axis defined by the axis of the support rod. Thus when the pivot lever pivots in response to movement of the control lever, the support rod is caused to rotate about its longitudinal axis. The rotation of the support rod influences a rotatable sleeve attached to the distal end of the rod to swing about an axis defined by the support rod.

The rotatable sleeve is coaxial with and supports a pin extending along the pivot axis of the platform of the operator console when the control lever is in the neutral position. This forms the pivotal interface link allowing rotation of the console, as will be explained more in detail below. The pin is connected to the throttle cable by means of a clevis.

In operation, when the control lever is shifted laterally and forwardly along the shift track, the pin swings in response to the motion of the control assembly. This influences the throttle cable which in turn actuates the hydrostatic drive, causing the vehicle to go in the desired direction of advance whether the operator console is in a forward or rearward facing position.

Advantageously, the motion/speed linkage assembly with the pivotal interface link is designed to accommodate smooth and efficient movement between the two operating positions while also providing consistent response to operator manipulation of the controls regardless of the console position that is selected. To do this, the sleeve of the interface link rotates freely about the pin which extends vertically along the rotation or pivot axis of the platform when the control lever is in the neutral position. Thus, when the platform is rotated between the forward and rearward facing positions, the control lever remains operative to actuate the linkage assembly in the appropriate direction.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects, all without departing from the invention. Accordingly, the drawings and descriptions will be regarded as illustrative in nature and not as restrictive.

BRIEF DESCRIPTION OF THE INVENTION

The accompanying drawing incorporated in and forming a part of the specification, illustrates several aspects of the present invention and together with the description serves to explain the principles of the invention. In the drawing:

FIG. 3 is a top view of the operator console and drive system within the console in a rearward facing position;

FIG. 4 is a perspective view of the motion/speed linkage assembly; and

FIG. 5 is a side view and partial cross-sectional view showing in closer detail the pivotal interface link of the linkage system and the bearing ring and roller for pivotally mounting the platform to the vehicle.

Reference will now be made in detail to the present preferred embodiment of the invention, an example of which is illustrated in the accompanying drawing.

DETAILED DESCRIPTION OF THE INVENTION

Figure 1:
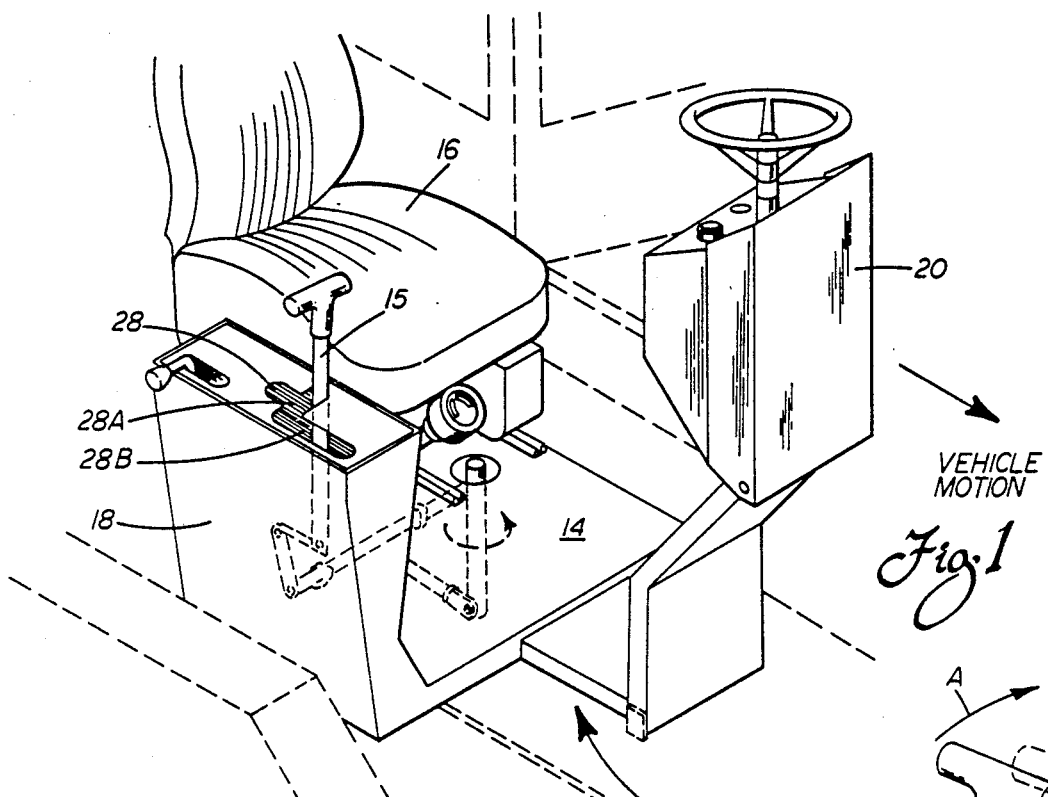
FIG. 1 is a perspective view of the operator console.
Figure 2:
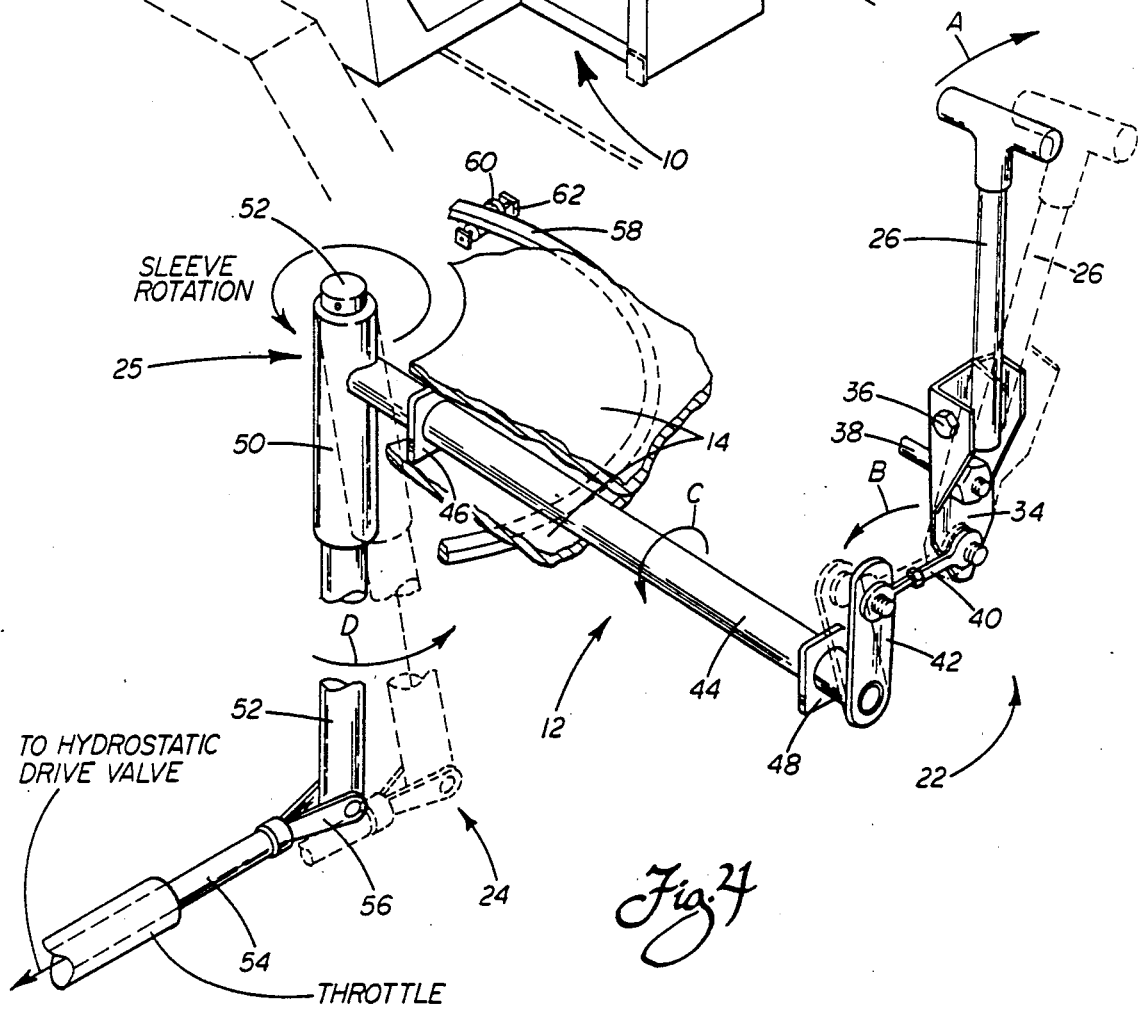
FIG. 2 is a top view of the operator console when in a forward facing position and showing the hydrostatic drive system in schematic form.

Reference is now made to FIGS. 1 and 2 which portray the directional orientation of an operator console 10 in the forward facing position and to FIG. 3 showing the rearward facing position. The operator console 10 and motion/speed linkage assembly 12, more particularly described below, are specially designed to allow ease and efficiency of rotation between these positions.

The operator console 10 includes a platform 14, to which is attached an operator's seat 16. A control unit 18 is integrally mounted to platform 14 and allows the operator to advance and control the speed of the bidirectional service vehicle. A steering unit 20 is also integrally mounted to the platform 14 and allows the operator to steer the vehicle.

As described in greater detail below, the integral nature of the operator's seat 16 and control and steering units 18, 20, respectively, allows the entire console 10 to rotate as one between the forward facing position (FIG. 1) and the rearward facing position (FIG. 3). This allows the operator to safely and efficiently manipulate the vehicle controls and steering in the exact same manner at all times independent of console 10 orientation on the vehicle. More specifically, when the operator shifts from the neutral position to a forward shift position, for example, the vehicle properly moves in the direction ahead of operator orientation.

As best shown in FIG. 4, the motion/speed linkage assembly 12 includes a control assembly, generally referred to by reference numeral 22 and a throttle assembly, generally referred to by reference numeral 24. A pivotal interface link, generally designated by the reference numeral 25, interconnects the control and throttle assemblies. A control lever 26 extends through and is guided by shift track 28. The operator manipulates control lever 26 forwardly within shift track 28 (see FIGS. 2 and 3) to propel the vehicle in the direction of his orientation.

More specifically, control lever 26 is attached to an actuator plate 34 by a bolt 36. Control lever 26 pivots laterally about bolt 36 to facilitate movement between the neutral position 28a and, for example, the forward shift position along offset path 28b of shift track 28.

When control lever 26 is moved in the direction of action arrow A from the neutral position (shown in full line) to a forward shift position (shown in phantom line), actuator plate 34 is caused to be pivoted about shaft 38 which is fixed to the control unit 18. A connecting link 40 is attached at its proximal end to actuator plate 34 and at a distal end to a pivot lever 42. As can be appreciated from viewing FIG. 4, when actuator plate 34 pivots in response to movement of control lever 26, connecting link 40 is caused to move in the direction opposite that of the actuating movement of control lever (note action arrow B).

A support rod 44 is attached at one end to pivot lever 42. Support rod 44 is held by and rotates within bearing mounts 46, 48, which depend from the underside of the platform 14 (see FIG. 5). When the pivot lever 42 pivots (as shown), the support rod 44 rotates about its longitudinal axis, as shown by action arrow C.

Support rod 44 is attached at its distal end to a rotatable sleeve 50 of the interface link 25. Rotatable sleeve 50 is coaxial with and supports a pin 52 which extends along the rotational or pivot axis of platform 14 when control lever 26 is in the full line neutral position. As support rod 44 rotates about its axis within bearing mounts 46, 48 as described above, the sleeve 50 and pin 52 swing from the substantially vertical full line position to the phantom line position (note action arrow D). Thus, as can be appreciated from viewing FIG. 4, support rod 44 defines the swing axis of rotatable sleeve 50 and pin 52, which axis is substantially perpendicular to the rotational axis of platform 14.

Pin 52 is attached at its distal end to a throttle cable 54 through a clevis 56. Throttle cable 54 is attached to the reversible hydrostatic drive valve 30, which upon being supplied with pressurized hydraulic fluid from the pump and reservoir 31, controls the operation of the hydrostatic drive 32 (see FIGS. 2 and 3). When rotatable sleeve 50 and pin 52 swing in response to a forward movement command of the control lever 26, the throttle cable 54 is caused to move from its neutral full line position to an actuating phantom line position. The extensible movement of throttle cable 54 is in the same direction as the movement of control lever 26. This causes hydrostatic drive valve 30 to also move in the same direction as the forward motion of control lever 26. The motion of hydrostatic drive valve 30 thus actuates hydrostatic drive 32 which in turn communicates the proper forward direction of vehicle movement to the drive wheels.

As best shown in FIGS. 2 and 3, the operator manipulates control lever 26 in the same manner independent of the forward facing or rearward facing orientation of the console 10. The forward motion of control lever 26 actuates hydrostatic drive 32 through the motion/speed linkage assembly 12, as described above and causes the vehicle to proceed in the proper direction with respect to operator orientation. This advantageously eliminates the operator's need to instantaneously consider which direction to move control lever 26 to bring about proper vehicle movement. Thus, operator confusion is eliminated and overall vehicle safety is improved. As shown in FIGS. 4 and 5, a bearing ring 58 is attached to the underside of platform 14. Bearing ring 58 cooperatively engages a plurality of rollers 60 attached to the vehicle by roller mounts 62. Preferably, there are at least three rollers 60 over which bearing ring 58 can travel. This rolling action advantageously allows platform 14 to be rotated easily between the forward and rearward facing positions.

More specifically, in order to allow rotation of the console 10, the control lever 26 is placed in the neutral position along the shift track at 28a. When in this position, the interface link 25 (rotatable sleeve 50 and pin 52) is in a substantially vertical position. extending along the pivot axis of platform 14. This positioning of the interface link allows the rotation of platform 14 between its forward and rearward facing positions in a very easy and efficient manner.

As best shown in FIGS. 4 and 5, support rod 44 is mounted within bearing mount 46 and bearing mount 48, which are attached to the underside of the platform 14. In addition, rotatable sleeve 50 is received about pin 52 so as to allow the free rotation for repositioning the console 10. As a result, the entire control assembly 22 rotates with platform 14 between the forward facing position and the rearward facing position. At the same time, the throttle linkage assembly 24 remains stationary with respect to the vehicle frame. As clearly shown in FIG. 3, the movement of the control lever 26 forward in the new position of the console 10, causes the valve 30 to be in the opposite direction from before. The vehicle now moves in the direction of operator orientation and the forward movement is the same as what previously was rearward movement. In either mode of operation, the graduated movement of the lever 26 serves to properly vary the speed of the vehicle. This feature allows the ease of operation described above by providing proper control orientation and throttle operation for the operator to provide proper direction of vehicle movement.

In summary, numerous benefits have been described which result from employing the concepts of the present invention. In particular, the motion/speed linkage assembly 12 is designed so that control assembly 22 pivots with the platform 14 at the interface link 25 while the throttle assembly 24 remains stationary. As a result, the operator may manipulate the control lever 26 in the same manner regardless of the orientation of the console 10. The vehicle moves in the proper and desired direction and at the proper speed depending on the extent of lever movement. The sleeve 50 of the control assembly 22 rotates about the pin 52 to allow the switch in the mode of operation. Once the console 10 is in the proper operator position, the movement of control lever 26 from a neutral position to a forward or reverse shift position swings rotatable sleeve 50 and pin 52 about an axis defined by support rod 44. In turn, throttle cable 56 is moved in the appropriate direction to actuate the hydrostatic drive 32 which in turn communicates the desired direction of vehicle movement to the drive wheels. The entire motion/speed linkage assembly 12 is comprised of simple and reliable mechanical parts and, thus, the reliability and serviceability is maximized.

The foregoing description of the preferred embodiment of the invention has been presented for purposes of illustration and description. It is not intended to be exhaustive or to limit the application to the precise form disclosed. Obvious modifications or variations are possible in light of the above teachings. For example, a lock-out switch may be provided which detects the position of control lever 26. The lock-out switch would prevent rotation of the platform 14 and control assembly 22 when the control lever 26 is not in the neutral position. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. An operator control console and motion/linkage assembly for a service vehicle, comprising:
    a support platform;
    means for pivotally mounting said platform on said vehicle about a vertical pivot axis to allow said platform to pivot between a forward facing position and a rearward facing position relative to said vehicle; and
    motion/speed actuating means;
    said linkage assembly including an interface link defined by a pin extending along the vertical axis of rotation of said platform when said motion/speed actuating means is in a neutral position, a rotatable sleeve coaxial with and supporting said pin, means to swing said rotatable sleeve and pin about an axis substantially perpendicular to said pivot axis, and throttle means connected to said pin for operating said vehicle in response to the swinging action,
    whereby upon rotation of said platform said sleeve is free to move around said pin to provide proper operator orientation and throttle operation for the proper direction of vehicle movement.

2. The operator control console and motion/speed linkage assembly of claim 1, wherein said control console further includes:
    an operator's seat attached to said platform;
    a control unit attached to said platform; and
    a steering unit attached to said platform.

3. The operator control console and motion/speed linkage assembly of claim 2, wherein said mounting means further includes
    a bearing ring on the underside of said platform, and roller means on said vehicle engaging said ring.

4. The operator control console and motion/speed linkage assembly of claim 1, wherein said motion/speed actuating means includes:
    a control lever connected to said linkage assembly, whereby forward movement of said control lever swings said rotatable sleeve about a swing axis to actuate said throttle means in the proper direction.

5. The operator control console and motion/speed linkage assembly of claim 4, wherein said swing means includes a support rod for said sleeve positioned in a plane substantially perpendicular to the plane of motion of said sleeve, said support rod defining the swing axis of said sleeve and pin.

6. The operator control console and motion/speed linkage assembly of claim 5, wherein said support rod is attached to said platform by depending bearing mounts.

7. The operator control console and motion/speed linkage assembly of claim 1, wherein said throttle means further includes:
    a throttle cable; and
    means for attaching said throttle cable to said pin.

8. An operator control console and motion/speed linkage assembly for a service vehicle comprising:
    a support platform;
    means for pivotally mounting said platform on said vehicle about a pivot axis; and
    motion/speed actuating means;
    said linkage assembly including an interface link defined by a pin extending along the axis of rotation of said platform when said actuating means is in a neutral position, a rotatable sleeve coaxial with and supporting said pin, means to swing said rotatable sleeve and said pin about an axis substantially perpendicular to said pivot axis, throttle means connected to said pin for operating said vehicle in response to the swinging action, said throttle means including a throttle cable and means for attaching said throttle cable to said pin, and a reversible hydraulic valve connected to a hydrostatic drive, the distal end of said cable being connected to said valve,
    whereby upon rotation of said platform said sleeve is free to move around said pin to provide proper operator orientation and throttle operation for the proper direction of vehicle movement.

9. An operator control console and motion/speed linkage assembly for a service vehicle, comprising:
    a support platform;
    means for pivotally mounting said platform on said vehicle about a pivot axis; and
    motion/speed actuating means;
    said linkage assembly including an interface link defined by a pin extending along the axis of rotation of said platform when said actuating means is in a neutral position, a rotatable sleeve coaxial with and supporting said pin, means to swing said rotatable sleeve and said pin about an axis substantially perpendicular to said pivot axis, and throttle means connected to said pin for operating said vehicle in response to the swinging action,
    said motion/speed actuating means including a control lever connected to said linkage assembly, whereby forward movement of said control lever swings said rotatable sleeve about said swing axis to actuate said throttle means in the proper direction, said control lever received in a shift track for guiding the movement of said control lever,
    whereby upon rotation of said platform said sleeve is free to move around said pin to provide proper operator orientation and throttle operation for the proper direction of vehicle movement.

10. The operator control console and motion speed linkage assembly of claim 9, wherein said control lever is pivotally mounted for transverse movement; said shift track defining an offset path with a center neutral section,
    whereby the neutral position for pivoting said console to effect a change in direction of vehicle movement is defined.

* * * * *